United States Patent [19]

Bullard

[11] 4,330,655

[45] May 18, 1982

[54] HIGH SOFTENING POINT SYNTHETIC RESIN

[75] Inventor: Herbert L. Bullard, Norton, Ohio

[73] Assignee: The Goodyear Tire & Rubber Company, Akron, Ohio

[21] Appl. No.: 7,119

[22] Filed: Jan. 29, 1979

[51] Int. Cl.$^3$ .................. C08F 240/00; C08F 236/02
[52] U.S. Cl. ..................................... 526/283; 526/290
[58] Field of Search ............................... 526/283, 290

[56] References Cited

U.S. PATENT DOCUMENTS

| | | | |
|---|---|---|---|
| 3,468,837 | 9/1969 | Wheeler | 260/33.6 |
| 3,577,398 | 5/1971 | Pace | 526/290 X |
| 3,721,658 | 3/1973 | Dickakian | 526/290 X |
| 3,784,530 | 1/1974 | Osborn | 526/283 |
| 3,890,285 | 6/1975 | Sumita | 526/283 X |
| 3,927,144 | 12/1975 | Hayashi | 526/283 X |
| 3,968,088 | 7/1976 | Asai . | |

OTHER PUBLICATIONS

Chem. Abst., 71, 5243(g), (1971).

*Primary Examiner*—C. A. Henderson
*Attorney, Agent, or Firm*—J. D. Wolfe

[57] ABSTRACT

This invention relates to relatively high softening point synthetic hydrocarbon resins relatively soluble in low Kauri butanol solutions.

2 Claims, No Drawings

HIGH SOFTENING POINT SYNTHETIC RESIN

TECHNICAL FIELD

This invention relates to relatively high softening point synthetic hydrocarbon resin. More particularly these relatively high softening point synthetic hydrocarbon resins are relatively soluble in low Kauri butanol solutions.

BACKGROUND ART

Natural and synthetic hydrocarbon resins are known as waxes and resins. They are sold commercially as tackifiers, coatings and extenders for elastomers. These materials generally are considered to have low softening points usually about 60° to 110° C. such as the ones taught in U.S. Pat. No. 3,784,530. Therefore the art has long desired higher softening point resins.

DISCLOSURE OF INVENTION

I have discovered that certain olefin fractions containing predominantly $C_{10}$ olefins can be polymerized to yield a resinous product having a softening point (Ring & Ball) of 130° to 150° C. and some as high as 160° C.

Generally these relatively high softening point synthetic resins of my invention have molecular weights in the range of about 1500 to about 2000 with the preferred range being 1600 to 1800, and exhibit good solubility in low boiling Kauri butanol solvents. Thus these resins with good solubility in the so called low Kauri butanol solvents can be readily formulated into inks or be used as tackifier resins, for instance in adhesive formulations.

These resins can be made by dissolving the olefin fractions containing predominantly $C_{10}$ olefins such as dicyclopentadiene dimers and codimers of isoprene, piperylene and cyclopentadiene in an aromatic solvent and polymerizing said olefins in the presence of a Friedel-Crafts metal catalyst such as aluminum chloride to produce a resin having a softening point (Ring & Ball) of 130° to 160° C.

The catalyst is removed, preferably by lime water treating, and then steam treating to remove the aromatic solvent. The softening point of the resin is to a degree sensitive to olefin fraction to solvent ratio. Therefore it is preferred to use about two parts of the olefin fraction to one part of solvent where softening points of 140° C., and preferably 150° C., are to be produced. Also, xylene is preferred to toluene as a solvent, as it gives lower viscosity polymerization mixtures and has less tendency for resins to gel the mixture.

The olefin fraction useful in this invention is available as distillation tower bottoms from those $C_6$ streams used to separate isoprene in relatively pure, synthetic rubber grade material. These tower bottoms or fractions normally contain anywhere from about 20 to 50 percent dicyclopentadiene, 5 to 30 percent heavy $C_{10}$, viz the so called dimer and codimers of isoprene, piperylene and related $C_5$'s, 5 to 25 percent piperylene, 5 to 15 percent cyclopentene, with the rest being benzene and mixtures of related $C_5$ and $C_6$ hydrocarbons, both saturated and unsaturated, with no specific hydrocarbons in the related $C_5$ and $C_6$ hydrocarbons being present in more than about a fraction of a percent to a few percent, and preferably less than about 5 percent on a mol basis.

BEST MODE FOR CARRYING OUT THE INVENTION

The nature of this invention, its objects and advantages can be more readily appreciated by reference to the following illustrative and exemplary examples where all percentages and parts are by weight unless otherwise designated.

EXAMPLE 1

A number of samples from the bottom of a distillation tower at Beaumont, Texas for separation of isoprene from various refinery streams were collected and analyzed for different individual hydrocarbon components. These samples (100 parts) were blended with solvents, either aromatic or aliphatic, to give the desired polymerization mixture. The polymerization mixture was charged to a polymerization reactor and as the mixture was stirred the Friedel-Craft metal catalyst as a dispersion in the solvent was added to the reactor. Since the polymerization is exothermic the reaction is cooled to maintain the polymerization mixture at essentially ambient temperature. About 30 to 60 minutes after the exotherm ceases small amounts of water and powdered lime were added to the reactor to destroy the catalyst and neutralize the free acid generated. The polymerization mixture was filtered under a pressure differential and then steam stripped to obtain the resin essentially free of the solvent and unpolymerized components of the charge.

Lighter colored resins are produced where the feed stock is passed through fuller's earth prior to the polymerization.

Table I shows analysis of the feed stock and Table II shows properties of resins obtained with feed stocks, solvent and catalyst used in the experimental runs of said tables. These resins were dispersible in ink solvents and could be formulated into inks with pigments such as carbon black and in 50/50 blends with pale crepe rubber based adhesive exhibited good tack and adhesion in shear.

TABLE I

| Feed Stock | 43-1 | 60 |
| --- | --- | --- |
| 2-pentene | 0.4 | 0.6 |
| 2,3-dimethyl butane | — | 0.2 |
| 2-methyl pentane | 0.2 | 4.0 |
| ¾-methyl-1-pentene | 3.5 | 0.8 |
| t-piperylene | 0.8 | 4.4 |
| 2,3-dimethyl-1-butene/heptane | 0.5 | — |
| c-piperylene | 3.7 | 0.6 |
| cyclopentene | — | 0.6 |
| 1-pentyne | 1.3 | — |
| hexane | — | 3.5 |
| 2-methyl-1-pentene | 2.6 | 4.5 |
| t-2-hexene | 1.2 | 0.6 |
| 1,5-hexadiene | 4.0 | 1.3 |
| 2,2-dimethyl pentane | — | 0.4 |
| 3-methyl-c-2-pentene | — | 0.2 |
| 2-methyl-2-pentene | 0.3 | 0.4 |
| c-2-hexane | 0.4 | 0.3 |
| 4,4-dimethyl-t-2-pentene | — | 0.3 |
| methyl cyclopentane | — | 1.6 |
| 2-pentyne/3-m-t-2-pentene | — | 0.8 |
| light unknowns | 4.9 | 3.5 |
| benzene | 1.9 | 12.3 |
| dicyclopentadiene | 52.0 | 41.4 |
| Other $C_{10}$'s | 22.3 | 17.8 |
| | 74.3 | 59.2 |

TABLE II

| Run 7517 | 43-3 | 61 | 62-1 | 62-2 |
|---|---|---|---|---|
| Catalyst Charge | 3 | 3 | 3 | 3 |
| g AlCl$_3$ | 3 | 3 | 3 | 3 |
| solvent type | heptane | xyl/hept | xylene | xyl/hept |
| g solvent | 50 | 25/2 | 5 | 25/25 |
| Feed Material # | 43-1 | 60 | 60 | 60 |
| g Feed material | 200 | 200 | 200 | 200 |
| g xylene | 90 | 75 | 95 | 72 |
| Yield (g) | 32 | 77 | 91 | 80 |
| SP. °C. | 125 | 140 | 152.5 | 130 |

While certain representative embodiments and details have been shown for the purpose of illustrating the invention it will be apparent to those skilled in this art that various changes and modifications may be made therein without departing from the spirit or scope of the invention.

I claim:

1. A synthetic hydrocarbon resin having a softening point (Ring and Ball) greater than 130° C. and up to about 160° C., a molecular weight of about 1500 to 2000 and being soluble in a low boiling Kauri butanol solvent.

2. The resin of claim 1 wherein the resin contains predominantly groups derived from dicyclopentadiene.

* * * * *